United States Patent [19]
Campbell et al.

[11] Patent Number: 6,058,387
[45] Date of Patent: *May 2, 2000

[54] DYNAMIC INFORMATION ARCHITECTURE SYSTEM AND METHOD

[75] Inventors: Allan P. Campbell, Wheaton; John H. Christiansen, Warrenville, both of Ill.

[73] Assignee: The University of Chicago, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/593,937

[22] Filed: Jan. 30, 1996

[51] Int. Cl.$^7$ ..................................................... G06N 5/00
[52] U.S. Cl. ................................. 706/60; 706/11; 706/45; 706/46; 706/50
[58] Field of Search ....................... 395/12, 62; 364/578; 706/11, 45, 46, 47, 50, 53, 59, 60, 61

[56] References Cited

U.S. PATENT DOCUMENTS

| | | | |
|---|---|---|---|
| 4,626,992 | 12/1986 | Greaves et al. | 600/300 |
| 4,868,763 | 9/1989 | Masui et al. | 706/10 |
| 4,965,743 | 10/1990 | Malin et al. | 706/45 |
| 5,019,961 | 5/1991 | Addesso et al. | 700/87 |
| 5,355,444 | 10/1994 | Chirico | 706/45 |
| 5,386,498 | 1/1995 | Kakefuda | 706/59 |
| 5,799,292 | 8/1998 | Hekmatpour | 706/11 |

OTHER PUBLICATIONS

David G. Castillo et al. "GOST: An Active Modeling System for Costing and Planning NASA Space Programs," System Sciences, 1991 Annual Hawaii International Conference, pp. 396–406, 1991.

*Primary Examiner*—Tariq R. Hafiz
*Assistant Examiner*—Jason W. Rhodes
*Attorney, Agent, or Firm*—Brinks Hofer Gilson & Lione

[57] ABSTRACT

A dynamic information architecture system and method for coupling one or more independent computer models to a computer expert system. A context manager establishes the couplings at run-time based upon a user's input goals and constraints. The context manager links available, but not readily compatible, computer models to solve for the user's input. An interface is provided for enabling the linkages through a structure of objects and object classes. Entity, aspect and process objects are created according to each computer model to provide a common interface. Large or small scale computer models can be accessed collectively, and complex systems can be thus be modeled. An event queue is automatically assembled to schedule events that form an event driven computer simulation.

13 Claims, 15 Drawing Sheets

Microfiche Appendix Included
(5 Microfiche, 468 Pages)

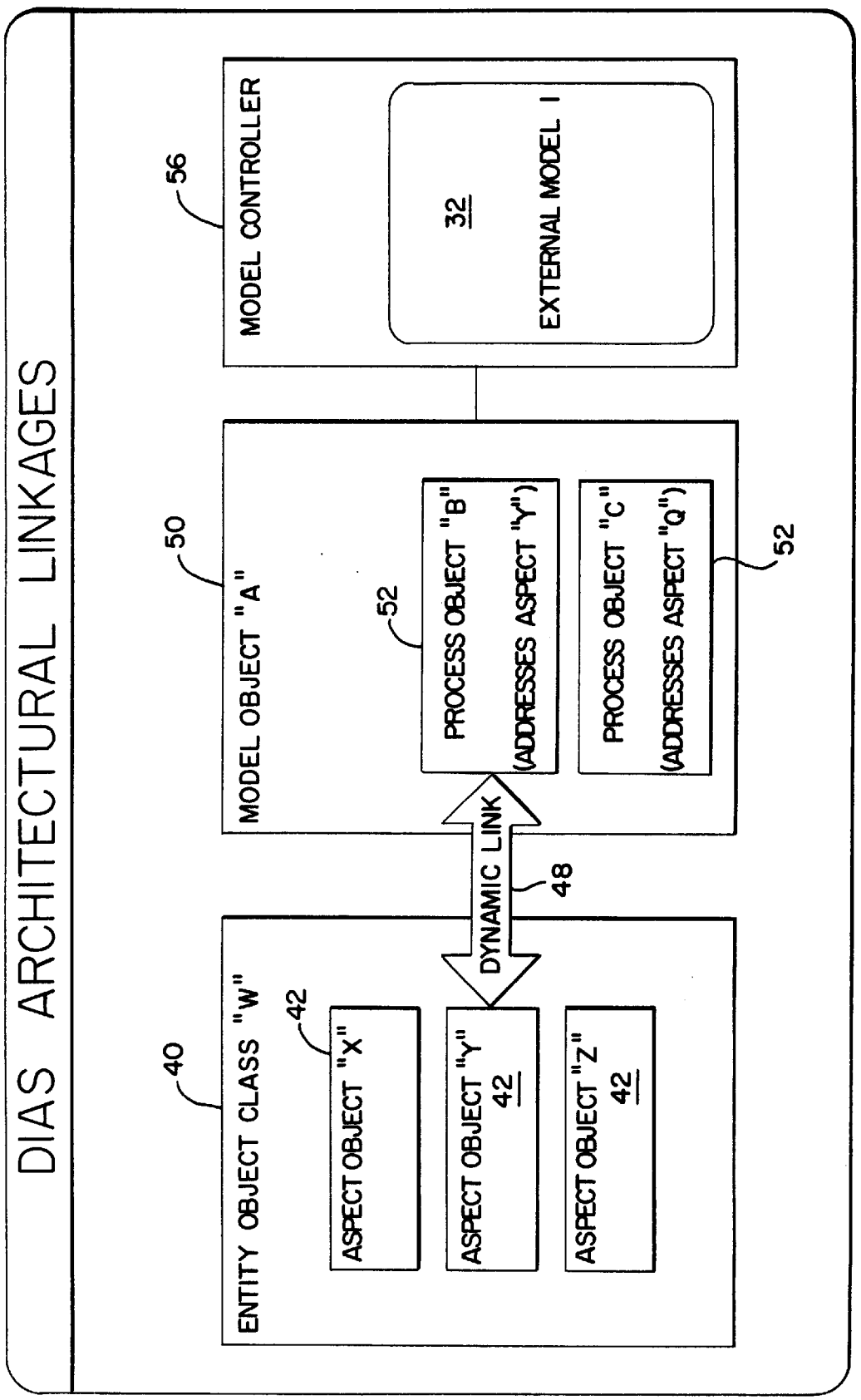

FIG. 8

EXAMPLE OF A PARAMETER OBJECT

PARAMETER 172

- PARAMETER NAME: 174
  SOIL SURFACE TEMPERATURE
- PARAMETER TYPE: 176
  FLOAT
- UNITS: 178
  DEGREES KELVIN
- DIMENSIONALITY: 180
  2-DIMENSIONAL ARRAY
- SIMULATION TIME STAMP: 182
  0600 HRS., 12 MARCH, 1998

CONSTRAINT LIST: 184
- CONSTRAINT OBJECT: 188
  ALLOWABLE RANGE OF VALUES: MINIMUM 0, MAXIMUM TMAX.
- CONSTRAINT OBJECT: 188
  ARRAY COLUMNS CORRESPOND TO THE FOLLOWING ORDERED LIST OF LONGITUDE COORDINATES: X1, X2, ...
- CONSTRAINT OBJECT: 188
  ARRAY ROWS CORRESPOND TO THE FOLLOWING ORDERED LIST OF LATITUDE COORDINATES: Y1, Y2, ...

PARAMETER JOURNAL: 186
- JOURNAL ENTRY: 190
  PARAMETER COMPUTED VIA PROCESS "A", WHICH ADDRESSES ENTITY ASPECT "B".
- JOURNAL ENTRY: 190
  PARAMETER CONVERTED FROM DEGREES CELSIUS TO DEGREES KELVIN VIA DEEM UTILITY PROCESS "C".

170

DYNAMIC INFORMATION ARCHITECTURE SYSTEM AND METHOD

A Microfiche Appendix consisting of 5 sheets (468 total frames) of microfiche is included in this application. The Microfiche Appendix contains material which is subject to copyright protection. The copyright owner has no objection to the facsimile reproduction by any one of the Microfiche Appendix, as it appears in the Patent and Trademark Office patent files or records, but otherwise reserves all copyright rights whatsoever.

FIELD OF THE INVENTION

This invention relates to the field of computer expert systems and computer models, and more particularly to a system and method for dynamically linking one or more computer models at run-time to an expert system in response to a user's inquiry.

BACKGROUND OF THE INVENTION

Many computer expert systems exist for analyzing and processing information to yield a result. Expert systems are typically created and designed to incorporate the methodology and/or analytical skills of an expert or specialist in a particular field. The fields can be far ranging, and include, for example, the professions, engineering, sciences and even the armed forces. A computer program designed as an expert system is therefore created for the purpose of applying the particular expert's knowledge or skill to a given problem faced by a lay observer or user. In this manner, the expert's knowledge or skill can be applied to the problem at hand without the need for the presence of the particular expert. The expert is thus free to develop further expertise while prior knowledge and skill are applied to a lay environment.

In the development of a computer expert system, in addition to the analytical aspect of the program, a database of information accessed by the expert system is also needed. Typically, the database must be created from scratch for each expert system in order to match and respond to the particular requirements of that system. The development of an expert system therefore requires a significant amount of effort in order to develop both the expert system and the associated databases required by the expert system. In other words, each database or databases prepared for an expert system is thus dependent upon the particular expert system being developed. This, of course, presents increased costs and effort associated with the development and use of each computer expert system.

Many databases and computer models currently exist that contain large amounts of collected data with respect to a particular environment or behavior. These databases are typically created independently, and are based on a collection of data or facts compiled by independent or non-affiliated entities. Vast amounts of data have been collected and stored in databases for access by independent computer systems. Due to the particular requirements, such as inputs, outputs and other specifications, of each computer system for which these databases have been created, each database is customized for its particular application. Although useful for its particular targeted system, each database is typically not accessible in general by other computer programs. As a result, many independent databases exist that can not currently be incorporated or integrated easily within different computer systems.

The prior art lacks the advantage of a system and method for coupling one or more independently created computer models for use with a particular computer expert system. A common interface for linking one or more existing computer models to solve or respond to a user's problem would be advantageous. Such a system and method would specify a common set of inputs, outputs and other constraints for dynamically linking independently created computer models. The linking would be achieved at run-time in response to a user's input of goals and/or constraints to the computer expert system. Such a system or method would include a predefined structure of objects to establish the interface that allows for the integration of independent or preexisting computer models and the computer expert system.

SUMMARY OF THE INVENTION

In view of the above, the present invention provides a dynamic information architecture system and method for receiving an inquiry from a user and linking one or more independently created computer models to a computer expert system. According to the system of the invention, a plurality of computer models are dynamically coupled at run-time to the computer expert system. The system includes a memory that stores the plurality of computer models, each of which model an existing system or process. A common interface is included that identifies the inputs, outputs and other specifications required to access the plurality of computer models. An input device is provided to receive the inquiry from the user to which at least one of the plural computer models can be applied. A context manager is also provided, which dynamically accesses at run-time the at least one computer model to respond to the user's inquiry.

In another aspect of the system of the invention, a plurality of independent computer models are dynamically linked to a computer expert system in response to an inquiry received from a user, where each independent computer model models an existing system or process. The system includes a distributed memory system having stored therein the plurality of independent computer models for access by the computer expert system. A common interface identifying the inputs, outputs and other specifications required to link one or more of the plurality of computer models to the computer expert system is provided. An input device is also provided, which is coupled to the distributed memory system, to receive at least one goal from the user to which one or more of the plurality of computer models can be applied. A context manager coupled to the input is provided to dynamically link at run-time the one or more of the plurality of computer models applied to respond to the user's inquiry.

According to the method of the invention, in order to dynamically couple at run-time at least one computer model to a computer expert system a memory is provided, as well as at least one independently developed computer model for modeling an existing system or process. A common interface is defined for identifying the inputs, outputs and other specifications required to access the at least one computer model. An inquiry is received from a user to which the at least one computer model can be applied, and the at least one computer model is dynamically accessed at run-time to respond to the user's inquiry.

According to another aspect of the method of the invention, steps for integrating a computer model for satisfying all or part of a user's inputted goals and constraints include providing a formal description of the computer model in terms of a model object and at least one process object. A context manager is provided to reason about the computer model based on the model's formal description, and to determine whether and in what manner the computer model can satisfy the user's goals and constraints.

In another aspect, the steps for integrating at least one independently developed computer model include creating a new model object, and identifying at least one entity aspect which the model object addresses. One process object is created for each entity aspect identified, and the one process object is incorporated into the model object. Input and output data dictionaries are then determined for the one process object by incorporating each input and output data dictionary into the one process object. The ability to detect whether other constraints on the applicability of a process object exist and incorporating those constraints into the one process object is also provided.

According to another aspect of the invention, the steps for integrating at least one computer model for dynamic coupling at run-time to a computer expert system include creating a model controller object and associating the model controller object with a corresponding model object. Linking one or more computer models with the model controller object, and identifying model code blocks that correspond to relevant process objects are provided. Facilities for identifying model internal variables corresponding to specific input/output parameters, creating a model address space pointer for each input/output parameter, and providing filters for translating between the model internal variables and the input/output parameters are also provided.

A method for satisfying a user's input requirements to a computer expert system is also contemplated. This aspect of the invention comprises the step of supplying at least one goal representing an unsatisfied input requirement. New requirements are then posed in response to the user's input, and an inference engine is provided to chain available processes together until all requirements are met and the at least one goal is satisfied.

According to yet another aspect of the invention, a structure of objects is provided for integrating at least one computer model for dynamic coupling at run-time to a computer expert system. The structure of objects is stored in a memory and includes a frame object class, an entity object class and an aspect object class. The frame object class includes frame objects, each of which corresponds to an area of interest. The entity object class includes entity objects, each of which represents an object in a simulation where each entity object can take on many possible aspects of behavior for that object. The aspect object class includes aspect objects, each of which forms an expression of a single aspect of an entity object's behavior.

In a further aspect of the invention, a system and method of automatically scheduling events to be sequenced in a computer simulation based upon a user's request includes automatically assembling an event queue of a least one event necessary to perform the simulation. The event queue stores the at least one event, which is executed in sequence in response to the user's request, to perform the computer simulation. An output of the results of the computer simulation is then communicated to the user.

The present invention provides the advantage of allowing access to one or more independently created computer models for use by a computer expert system to respond to a user's query. Although the computer models may not be susceptible of ready integration, the invention provides a system and method for interfacing between the preexisting, independent computer models and the computer expert system. In addition, the plurality of computer models can be stored in a distributed manner across many computer memories and systems. A computer expert system coupled to the distributed computer memories and systems can dynamically link at run-time those computer models needed in order to respond to a user's input of goals and constraints. The invention thus allows for the use and ready integration of independently created computer models by a newly created computer expert system without the need for recreating a new set of computer models for each independent expert system.

These and other features and advantages of the invention will become apparent upon a review of the following detailed description of the presently preferred embodiments of the invention, taken in conjunction with the appended drawings.

BRIEF DESCRIPTION OF THE DRAWINGS

FIG. 8 illustrates one presently preferred parameter object class;

DETAILED DESCRIPTION OF THE PRESENTLY PREFERRED EMBODIMENTS

Figure 1:
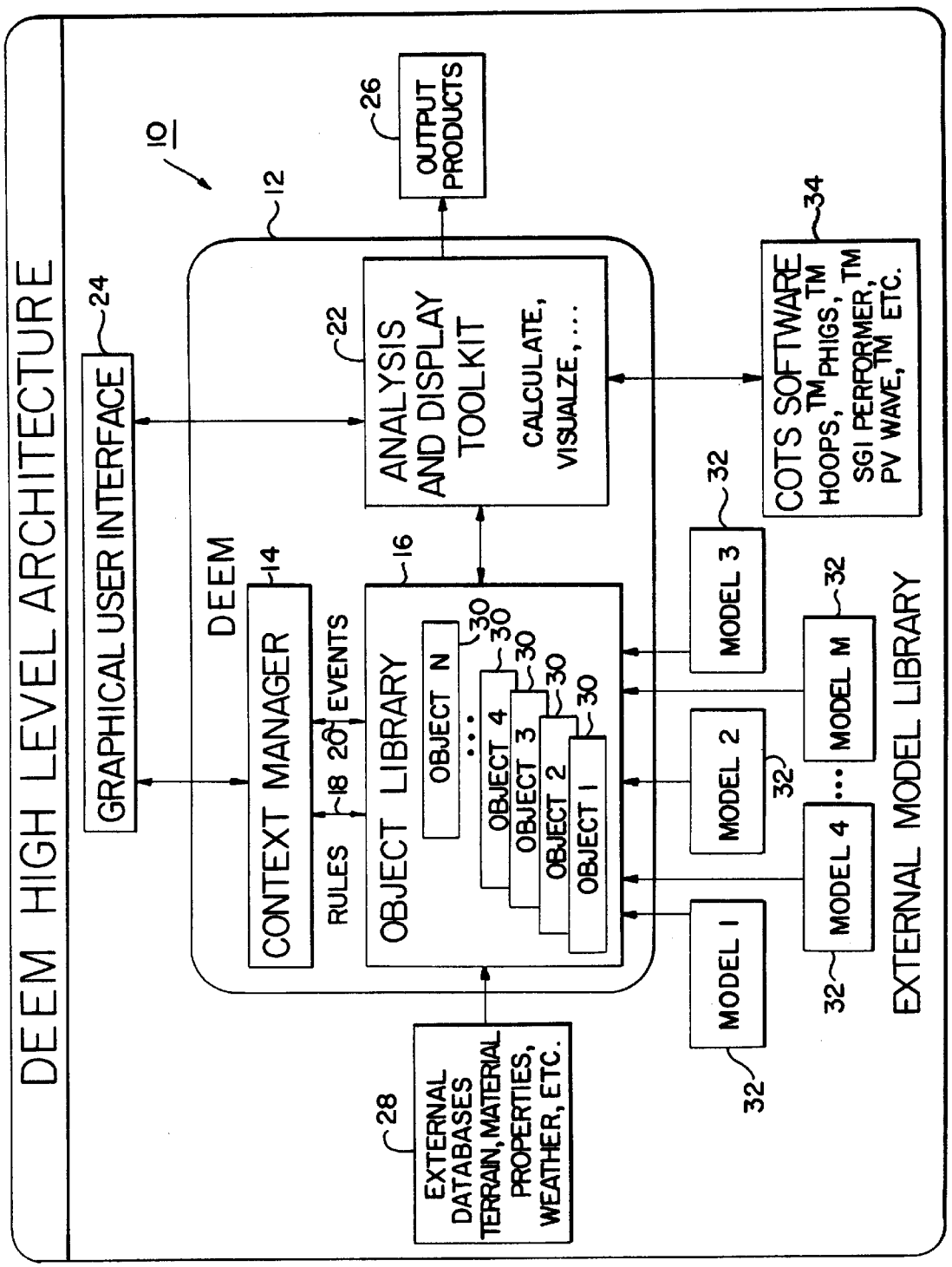
FIG. 1 is an architectural block diagram of the dynamic information architecture system of the invention.

Referring now to the drawings, where like reference numerals refer to like elements throughout, a high level architectural block diagram of a dynamic information system 10 is generally shown in FIG. 1. The dynamic information system 10 includes a processor 12, which executes the computer expert system used with the invention. The processor 12 includes a context manager 14, an object library 16 and an analysis and display tool kit 22. As illustrated in FIG. 1, the context manager 14 communicates rules 18 and events 20 bilaterally to and from the object library 16. As will be described in more detail below, the object library 16 preferably includes one or more objects 30.

The processor 12 communicates to the operator or user through a graphical user interface 24 provided on a display screen (not shown) in a manner generally known in the art.

As illustrated in FIG. 1, the graphical user interface 24 communicates bidirectionally to and from the context manager 14 and the analysis and display tool kit 22. The processor 12 also communicates with one or more external databases 28. The external databases 28 provide input to the object library 16. In a preferred embodiment of the invention, the external databases 28 can include information on terrain, material, properties, weather, etc. As those skilled in the art will appreciate, the external databases 28 can comprise a vast amount of differing compilations of data, which were created based upon the particular use and application of the database.

Through the analysis and display tool kit 22, the processor generates output products 26 for later use by the system. The analysis and display tool kit 22 performs the calculations and visualizations required by the user's input, and communicates bidirectionally with external software 34. Examples of the external software 34 included in the presently preferred embodiments of the invention comprise, photorealistic rendering programs such as HOOPS (Ithaca Software, Alameda, Calif.), PHIGS (Template Graphics Software, San Diego, Calif.), SGI Perform (Silicon Graphics, Inc., Mountain View, Calif.), PVwave (Visual Numerics, Inc., Houston, Tex.), etc. Examples of output products 26 produced by the analysis and display tool kit 22 include charts, datafiles, databases, etc.

As shown in FIG. 1, the processor 12 receives input from an external model library, which includes one or more computer models 32. As described above, the computer models 32 can be independently created for differing programs and environments. The computer models 32 can even be, and in fact are considered to be, incapable of ready communication or integration within the system 10. As described in more detail below, however, an interface is provided that allows the computer models 32 to be dynamically selected by the context manager 14 at run-time to respond to the input goals and constraints supplied by the user.

An example of the architectural linkage of objects for coupling one or more computer models 32 is illustrated in FIG. 2. As shown in FIG. 2(a), in order to establish a dynamic link 48 required between differing computer models 32, an entity object class 40 and a model object 50 are provided. The entity object class 40 preferably contains one or more aspect objects 42. According to the preferred embodiment, more than one entity object class 40 may be provided. The model object 50 includes one or more process objects 52. Each process object 52 addresses aspects referred to by the aspect object 42 to which it relates. Accordingly, a dynamic link 48 may be formed between a particular aspect object 42 (e.g., Aspect Object "Y") and the appropriate process object 52, as illustrated. Each model object 50, therefore, is linked or coupled at run-time to a model controller 56 required for the computer model 32.

One presently preferred example of the dynamic linkage discussed above is provided in FIG. 2(b). In the example, an atmosphere object 60 is provided including two aspects 62, 64. The first aspect 62 is the evolve atmosphere aspect, and the second aspect 64 is the surface exchange aspect. Each respective aspect 62, 64 is linked to a projection object 66, 68, and each of the projection objects 66, 68 is in turn linked to a model object 50.

Figure 2B:
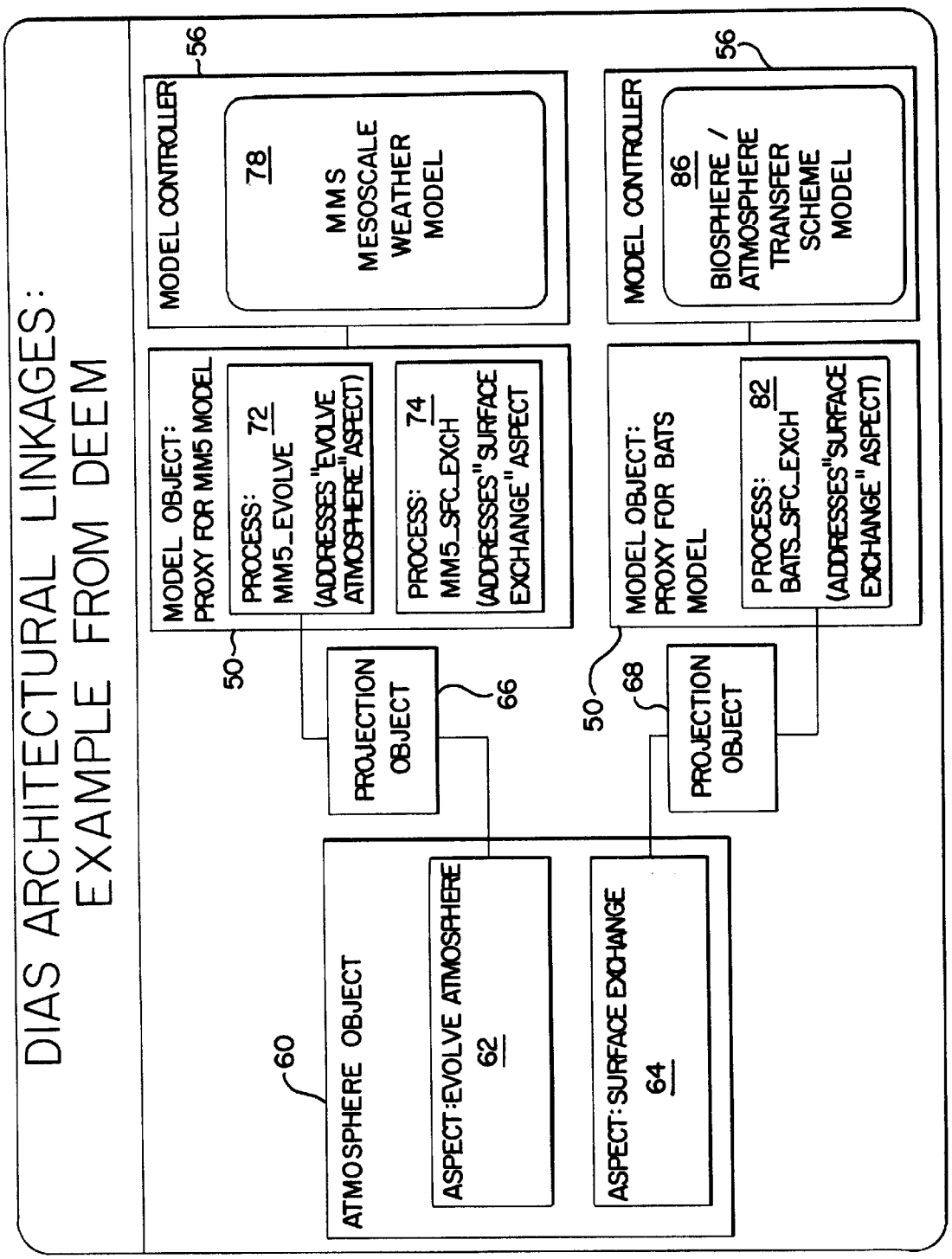
FIG. 2 is an example of the method and apparatus for coupling one or more computer models, where
FIG. 2(a) illustrates one preferred method and apparatus and FIG. 2(b) includes an example using the method and apparatus according to the preferred embodiment.

As shown in FIG. 2(b), a first model object 50 coupled to the projection object 66 forms or becomes a proxy for a MM5 Mesoscale Weather computer model. This model object 50 includes two processes 72, 74. The first process 72 addresses the evolve atmosphere aspect of the model 32 and is coupled through a projection object 66, as shown. No coupling is provided to the second process 74 that addresses the surface exchange aspect because it is not referred to by the evolve atmosphere aspect 62. However, the second model object 50 comprises a proxy for a Biosphere/Atmosphere Transfer Scheme ("BATS") computer model, which includes only one process 82. The one process 82 is coupled through the projection object 68, and addresses the surface exchange aspect 64. Each of the model objects 50 shown in FIG. 2(b) are ultimately coupled to model controllers 56. A first model controller 56 is coupled to the first model object 50, which is a proxy for the MM5 mesoscale weather model 78. The second model controller 56 is coupled to the second model object 50, which is a proxy for the BATS model 86.

Figure 3:
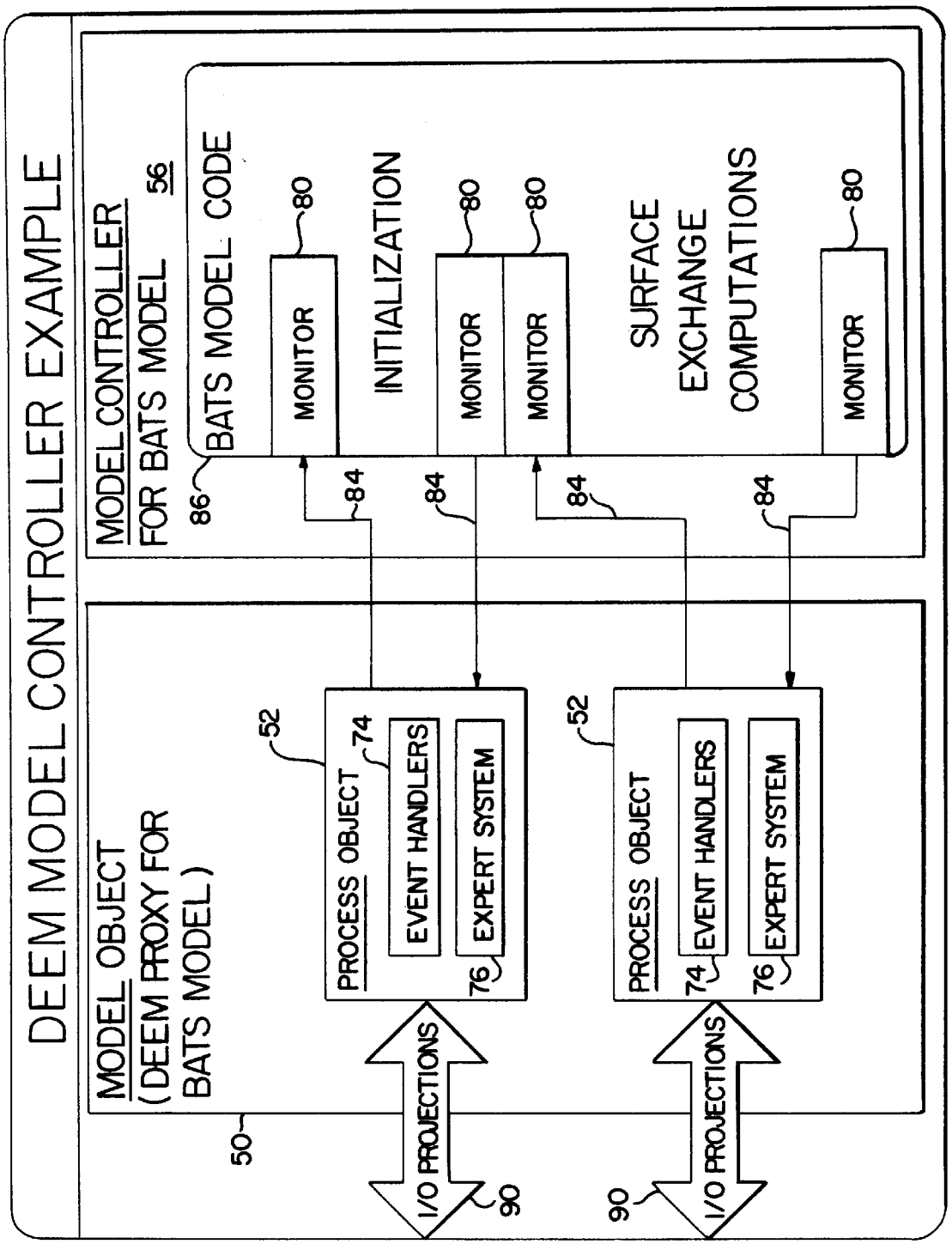
FIG. 3 shows a more detailed example of a model controller for use with the invention.

A more detailed example of a presently preferred model controller 56 is illustrated in FIG. 3. As shown, a model object 50 consisting of a proxy for the BATS model includes two process objects 52. Each process object 52 further includes event handlers 74 and an expert system 76. Each process object 52 also enables bidirectional input/output projections 90 to and from the model object 50, which is in turn coupled to the model controller 56. Accordingly, the model controller 56 for the BATS model 86 shown in the example includes the actual BATS model program code. The BATS model program code also preferably includes one or more monitor routines 80, which are coupled via a unidirectional link 84 to the respective process objects 52. The BATS model program code also further preferably includes an initialization routine and the surface exchange computations provided by this model.

Figure 4:
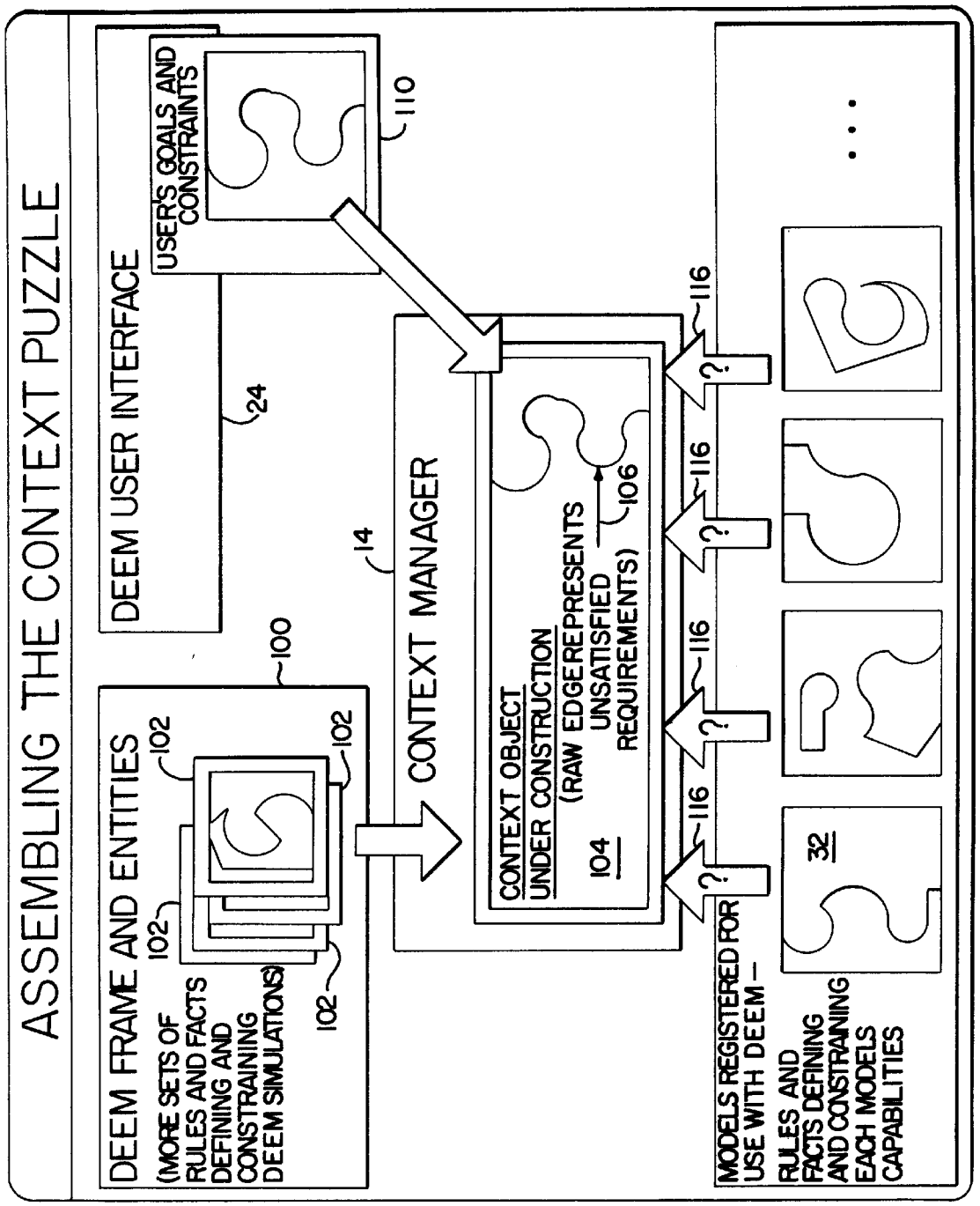
FIG. 4 is an illustration showing the building of a context puzzle by a context manager according to the method of the invention.

An illustration of the manner in which the presently preferred context manager 14 assembles the context "puzzle" provided by the user's inquiry is illustrated in FIG. 4. A collection of frame and entity objects 100 is coupled as input to the context manager 14. The group of frame and entity objects 100 includes one or more sets of rules and facts defining and constraining a particular simulation 102. Through the user interface 24, the user's goals and constraints 110 for a particular simulation are communicated to the context manager 14. Equipped with these pieces of the puzzle, the context manager 14 begins constructing and assembling a context object 104 to solve the user's inquiry. Any intermediate missing elements from the context object 104 represent unsatisfied requirements presented by the user's goals and constraints 110, which the context manager 14 will attempt to satisfy.

At run-time, the context manager 14 dynamically links one or more computer models 32 to complete the context object 106 and respond to the user's goals and constraints 110. Each computer model 32 is registered for use with the context manager 14 by including in advance the rules and facts defining and constraining each model's capabilities. At run-time, the context manager 14 receives input from the applicable computer models 32 based on the user's goals and constraints 110. Dynamic input links 116 are thus spontaneously created between the context manager 14 and the computer models 32 to receive the facts and rules associated with each model 32. Upon completion of the linking process, the context manager 14 is able to solve for the user's goals and constraints 110, and the result is saved in the completed context object 104. No unsatisfied requirements 106, therefore, should exist at this stage and the system is free to operate on another user's inquiry.

Figure 5:
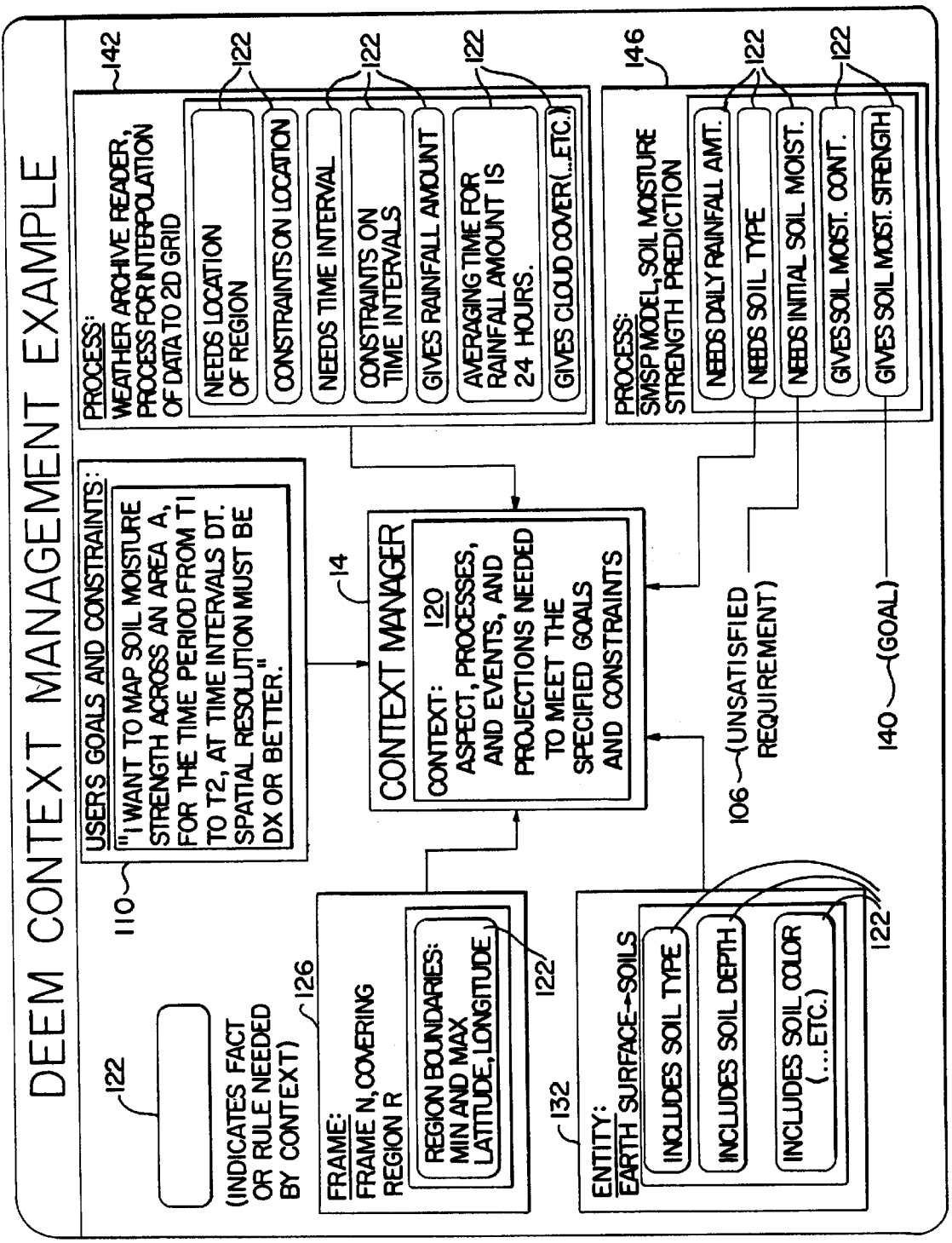
FIG. 5 shows an example of one presently preferred context manager shown in FIG. 1.

An example of the detailed analysis performed by one presently preferred context manager 14 for use with the invention is illustrated in FIG. 5. As shown in FIG. 5, the context manager 14 includes a context 120, which preferably includes aspects, processes, events and projections needed to meet the specific goals and constraints provided by the user. To satisfy the user's inquiry, the context manager 14 thus receives a plurality of inputs from various sources. The user provides the goals and constraints 110 as the starting impetus to the context manager 14. In the example shown in FIG. 5, the inputted goal and constraints are to map soil moisture strength across an area A, for the time period from T1 to T2, at time intervals dT, where spatial resolution must be dX or better. In response to this goal and constraints 10, the context manager 14 proceeds to determine how best to satisfy and solve for the user's requested simulation.

In an effort to satisfy the user's inquiry, the context manager 14 may require input from a frame 126, an entity 132, and one or more processes 142, 146. The process 146, for example, may include the soil moisture strength prediction ("SMSP") model. This model includes one or more facts or rules 122 that may be needed within the context 120. The facts or rules 122 associated with the SMSP process 146 include daily rainfall amounts, soil types, and initial soil moisture. The facts or rules 122 provided as outputs by the SMSP model include soil moisture content and soil moisture strength. Here, the soil moisture strength fact or rule 122 corresponds to the specific goal 140 input by the user. The initial soil moisture fact or rule 122, therefore, represents an unsatisfied requirement 106 in the context 120 of the example. The context manager 14 then couples the particular model 32 that would supply this unsatisfied requirement to the context 120 as it seeks to solve the user's inquiry.

In the example, the process 142 preferably includes the weather archive reader process for interpolation of data to a two-dimensional grid. This process 142 yields rainfall amount and cloud cover as its output facts or rules 122. Also coupled to the context manager 14 is a frame 126, which represents one of N frames, each covering a region R. Each frame 126 preferably includes one or more facts or rules 122 as described for the above processes 142, 146. In the particular frame 126 illustrated in FIG. 5, the associated facts or rules 122 for region R include the region boundaries, its minimum and maximum latitude and its longitude.

An entity 132 may also coupled to the context manager 14. The specific entity 132 shown in the example of FIG. 5 identifies the differing types of soils for the earth's surface. The facts or rules 122 included with this entity 132 may thus include soil type, soil depth, soil color, etc. Once supplied with all of the above inputs, the context manager 14 can solve for the particular context 120 in view of the specified goals and constraints 110 provided by the user.

Figure 6A:
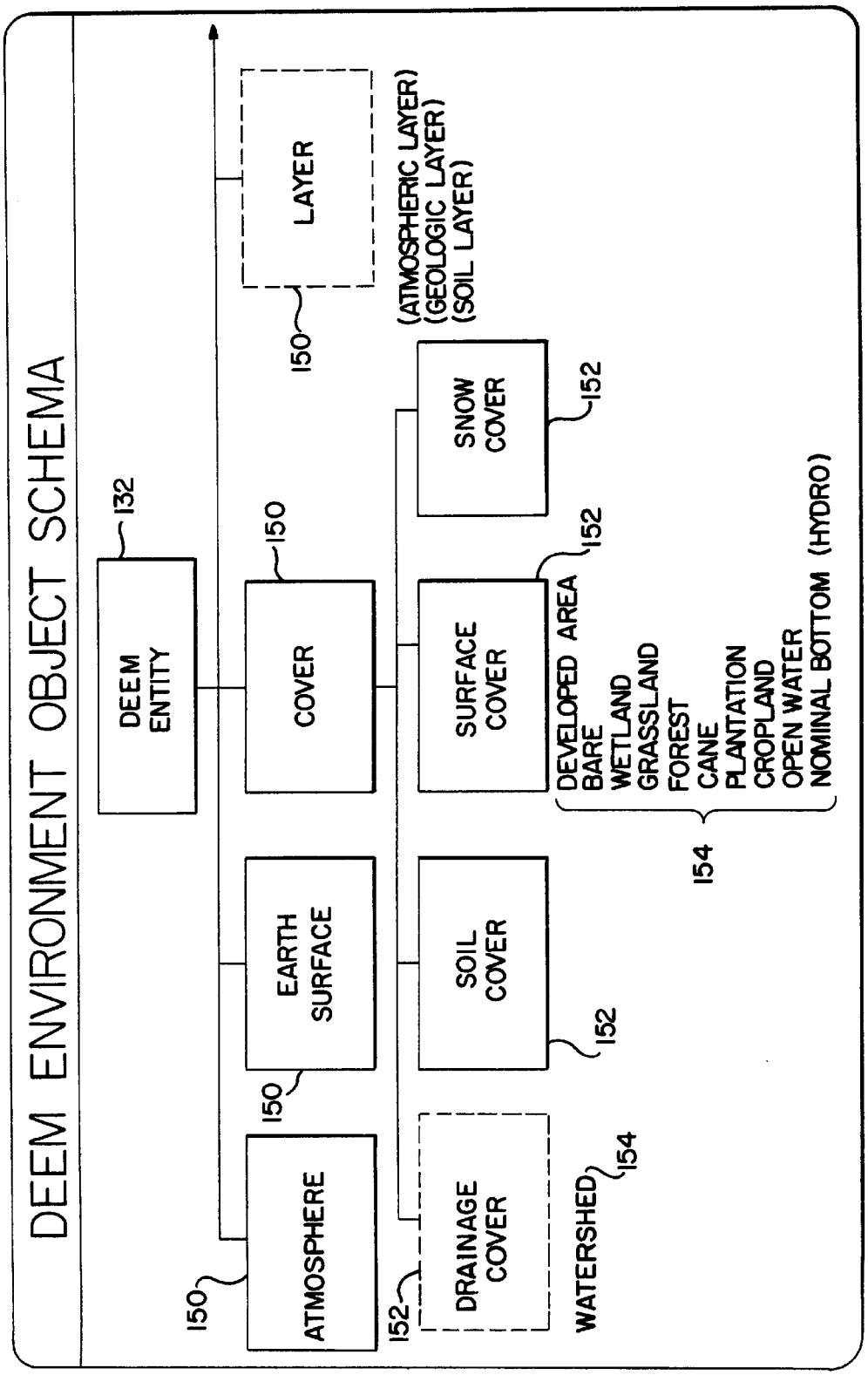
FIG. 6 shows a presently preferred object schema, where FIG. 6(a) identifies natural entities, FIG. 6(b) identifies artifact entities, and FIG. 6(c) identifies transportation entities.
Figure 6B:
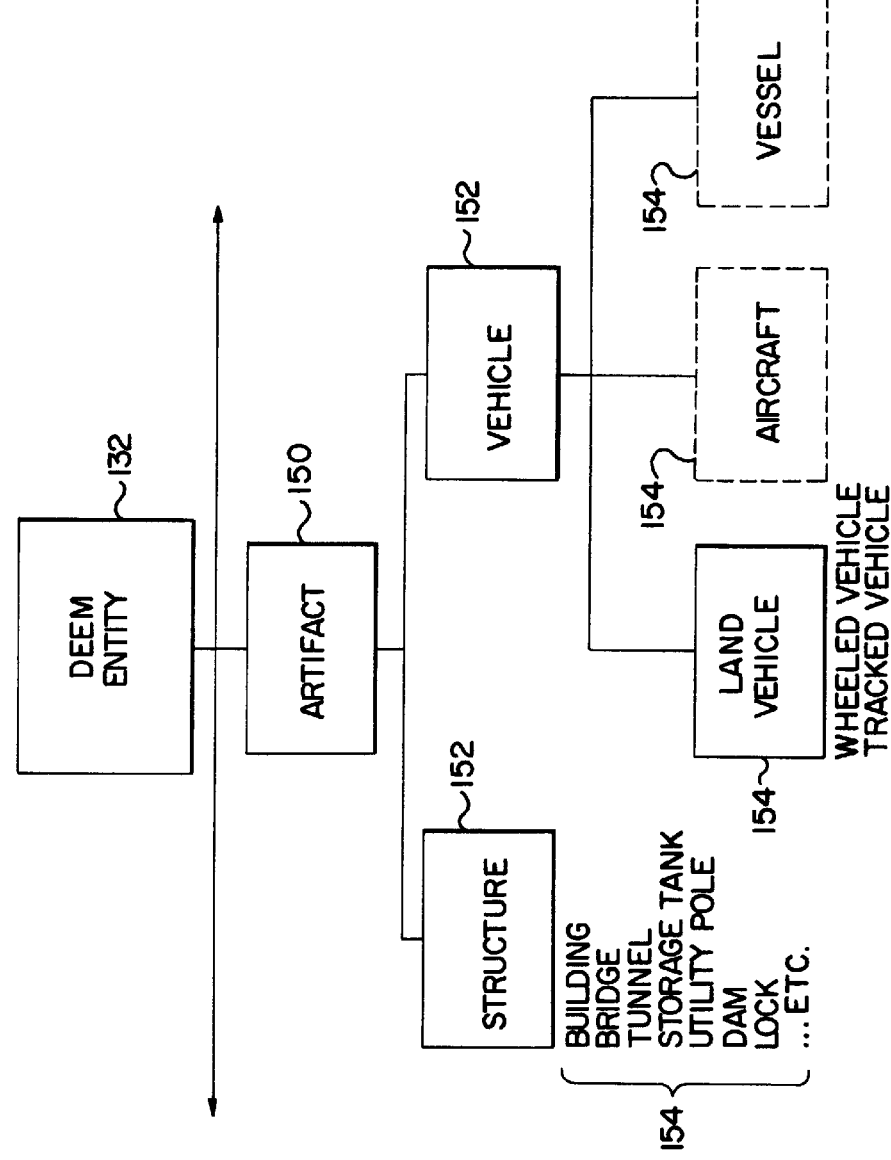
Figure 6C:
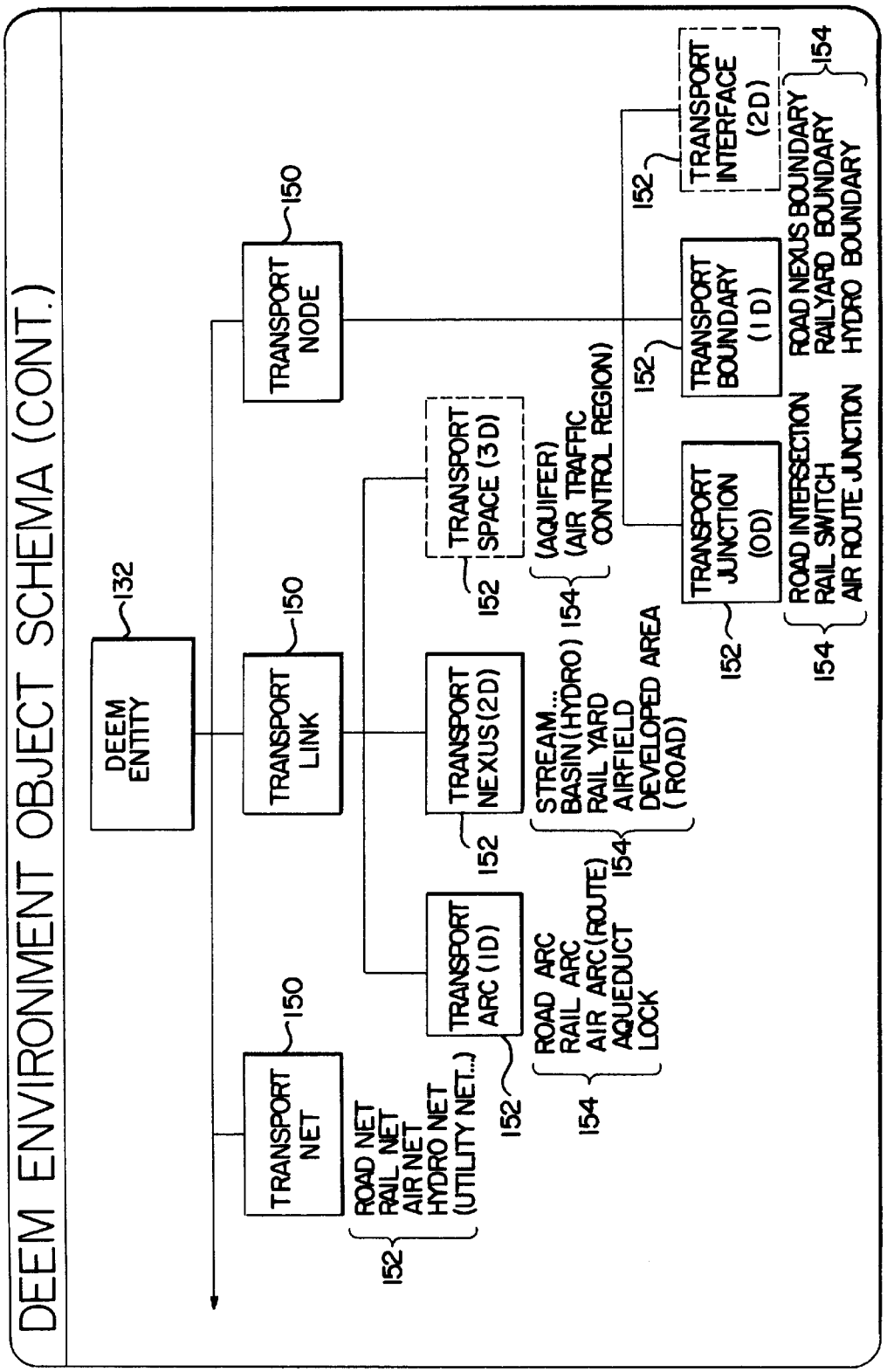

Referring now to FIG. 6, one presently preferred object schema is shown that allows for the dynamic linking described above by the preferred context manager 14. The object schema is illustrated in a tree structure as shown in FIG. 6, where the root of the object schema is represented by a particular entity 132. In the example shown in FIGS. 6(a)–6(c), the object frame represents the earth's environment. Associated with this frame, therefore, are natural, artifact and transportation entities 132. Completing the tree structure of the environment object schema are one or more aspects 150, which are associated with each entity 132.

As shown in FIG. 6(a), for example, the natural entity 132 has associated with it the atmosphere, earth surface, cover, and other layer aspects 150. Associated with the cover aspect 150 in the example shown in FIG. 6(a) are several processes 152 including drainage cover, soil cover, surface cover and snow cover. By way of example, the surface cover process 152 can include multiple sub-processes 154. These sub-processes 154 include developed area, bare area, wetland, grassland, forest, cane, plantation, cropland, open water, and nominal bottom (hydro) processes of the surface cover process 152 for the earth's surface. Alternatively, a process 152 may include none or only one sub-process 154. In the drainage cover process 152 shown in FIG. 6(a), only a watershed sub-process 154 is provided. Similarly, for the artifact aspect 150 associated with the natural entity 132, two processes 152 are included for structures and for vehicles. The structure process 152 and the vehicle process 152 are illustrated in FIG. 6(b).

As shown in FIG. 6(c), the transportation entity 132 associated with the environment frame includes transport net, transport link and transport node entities 150. Aspects 152 associated with the transport link entity 150 include a transport arc, a transport nexus and a transport space 152. These aspects 152 are preferably one dimensional, two dimensional and three dimensional aspects, respectively. Several aspects 152 associated with the transport node entity 150 include a transport junction, a transport boundary, and a transport interface. Each of these aspects 152 are preferably zero dimensional, one dimensional and two dimensional, respectively. Additional processes 154 associated with the several aspects 152 shown in FIG. 6(c) are also indicated.

Figure 7:
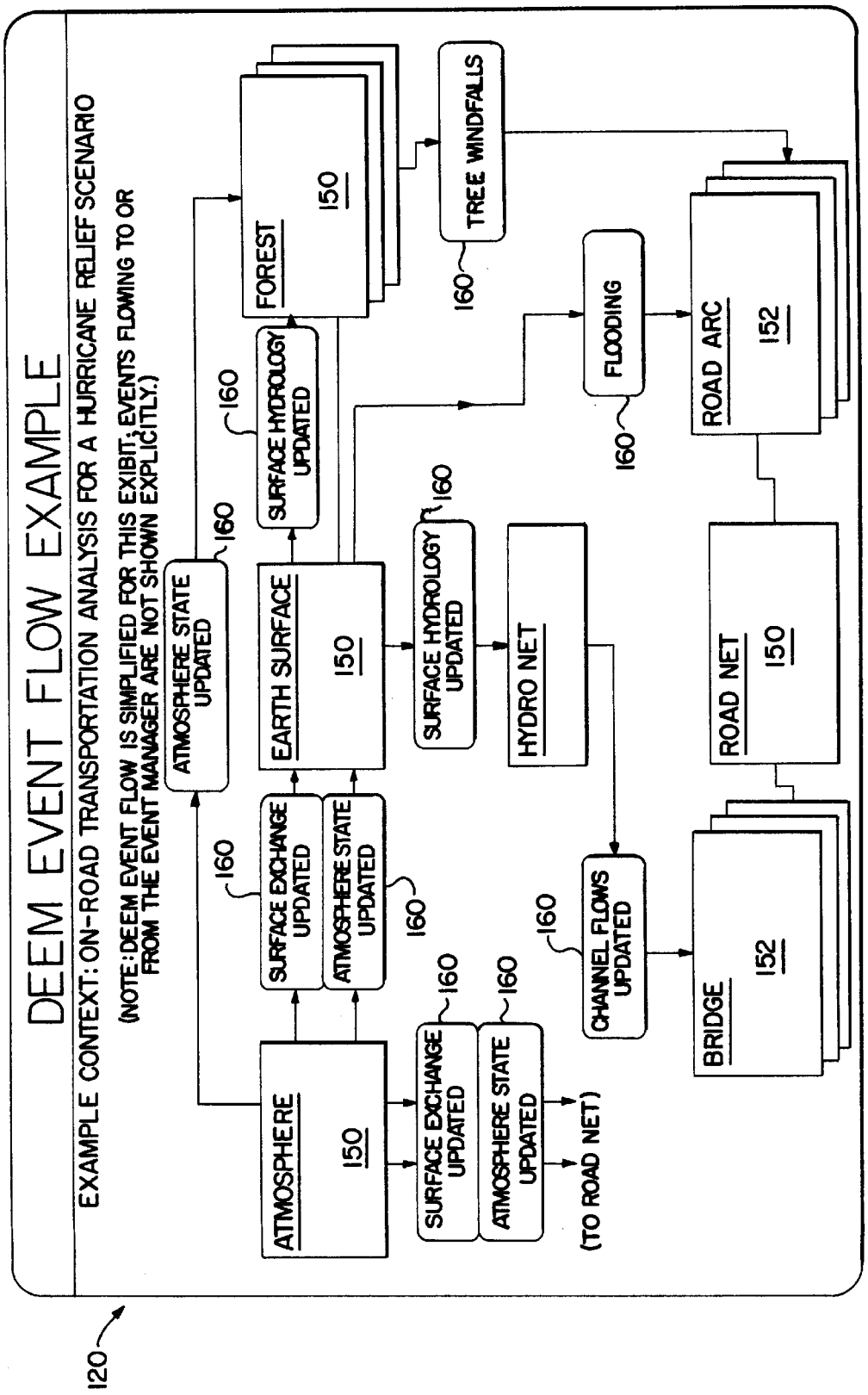
FIG. 7 shows one preferred context for a hurricane relief scenario using the system and method of the invention.

An example of one preferred context 120 representing a surface transportation analysis for a hurricane relief scenario event flow is shown in FIG. 7. In the example, aspects 150 for atmosphere, earth surface, forest, hydronet, and a road net are all provided. A bridge and road arc process 152 of the road net aspect 150 are included to model these features of the road net aspect 150. A plurality of events 160 are provided that illustrate the flow of facts and data between the differing aspects 150. (As those skilled in the art will appreciate, the event flow is simplified for this example; events flowing to or from an event manager are not shown explicitly.) Each time an event 160 is updated, further facts or data are communicated in the event flow from one aspect 150 to another. In the example shown in FIG. 7, if a tree falls or flooding occurs that event is communicated to the road arc process 152 so that a new road map for the planned evacuation can be developed. Similarly, channel flows for rivers or streams are updated with respect to bridges that may be unavailable (e.g., knocked out), which may affect the flow of surface transportation in case of an evacuation.

The plurality of data structures described above are created in order to allow the interface between the independent computer models 32 and the computer expert system 76. In the preferred embodiment of the invention, these data structures exist in the form of objects written in the preferred object oriented C$^{++}$ language. A complete printout of the presently preferred source code for implementing the presently preferred embodiment of the invention is provided in the Microfiche Appendix. A discussion of these objects and object classifications will now be presented in greater detail in connection with the FIGS. 8–10.

Referring now to FIG. 8, one presently preferred structure of a parameter object class 170 is shown. The preferred structure includes one or more parameters 172, where each parameter 172 preferably includes a parameter name 174, a parameter type 176, the units 178 of the parameter, the dimensionality 180 of the parameter and a simulation time stamp(s) 182 for the last use or access of the parameter 172. Each parameter 172 also includes a constraint list 184, and a parameter journal 186. The constraint list 184 comprises a list of constraint objects for the particular parameter 172. The parameter journal 186 comprises a list of operation objects describing operations performed on the particular parameter 172.

In the example illustrated in FIG. 8, the parameter name 174 is "soil surface temperature", the parameter type 176 is "float", the units 178 are degrees kelvin, the dimensionality 180 is a two-dimensional array, and the last simulation time stamp 182 is "0600 hours, Mar. 12, 1998." In addition, the constraint list 184 includes three constraint objects 188 consisting of an allowable range of values for regional boundaries, array columns corresponding to an ordered list of longitude coordinates, and array rows corresponding to an ordered list of latitude coordinates, respectively. The parameter journal 186 includes two journal entries 190, where the first journal entry 190 indicates that the parameter 172 was computed via process "A", which addresses entity aspect "B". The second journal entry 190 indicates that the parameter 172 was converted from degrees celsius to degrees kelvin via a utility process "C".

Figure 9:
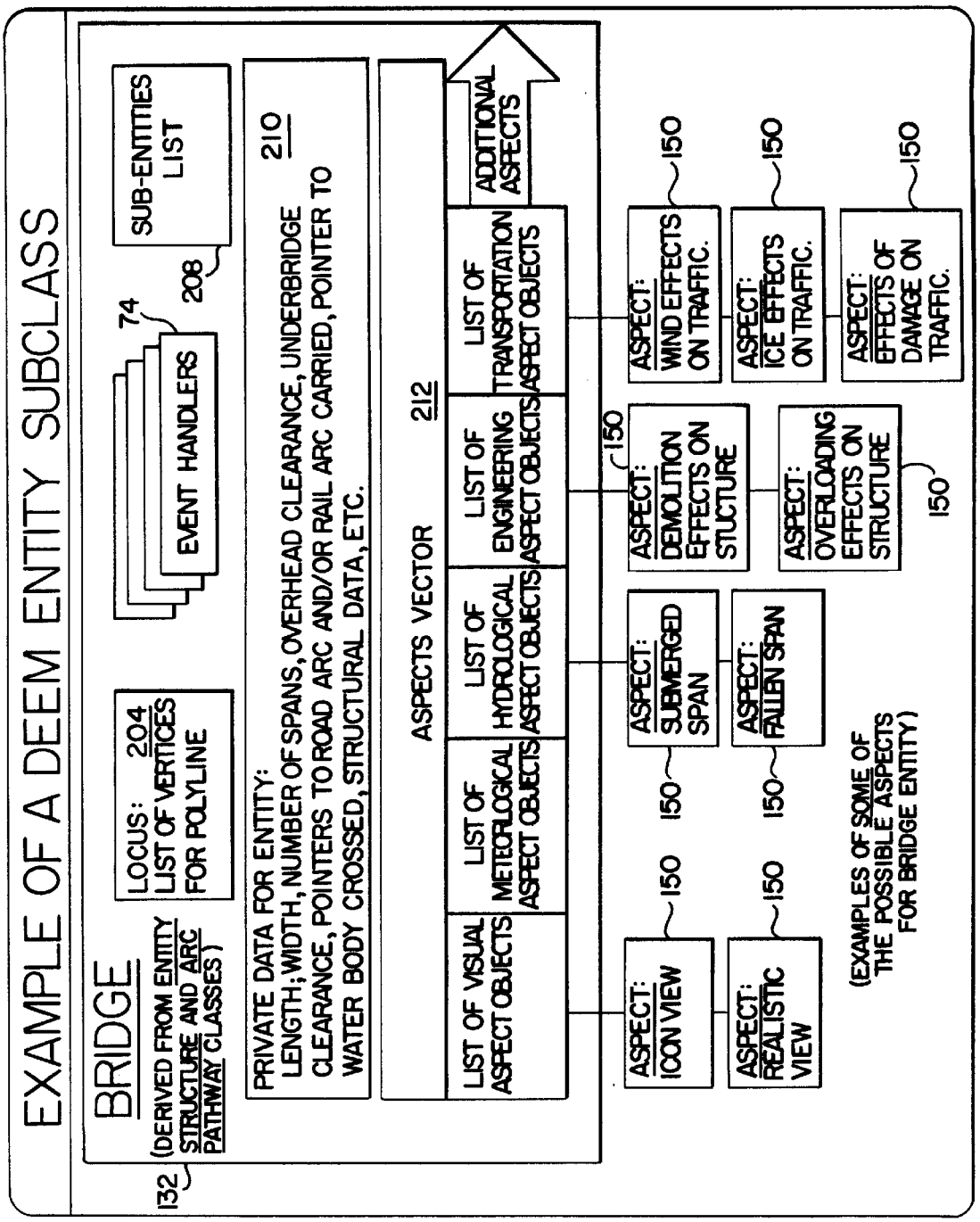
FIG. 9 illustrates one presently preferred entity object class.

One presently preferred organization of the entity object class 40 is illustrated in FIG. 9. One or more entities 132 are preferably included within the entity object class 40 where each entity 132 includes a locus 204 (e.g., list of vertices for Polyline), event handlers 74 and a sub-entities list 208. Also included in each entity 132 is the private data 210 associated with the particular entity 132, as well as an aspect vector 212 identifying the one or more aspects 150 (see FIG. 7) associated with the entity 132. Examples of the private data 210 for the bridge entity 132 shown in FIG. 9 include the length, width, number of spans, overhead clearance, under bridge clearance, pointers to road arc and/or rail arc carried, a pointer to any waterbody crossed, and structural data for the bridge. Examples of the presently preferred aspects 152 associated with the bridge entity 132 are provided in FIG. 9. Additional aspects, of course, can be added as provided by the aspects vector 212.

Figure 10:
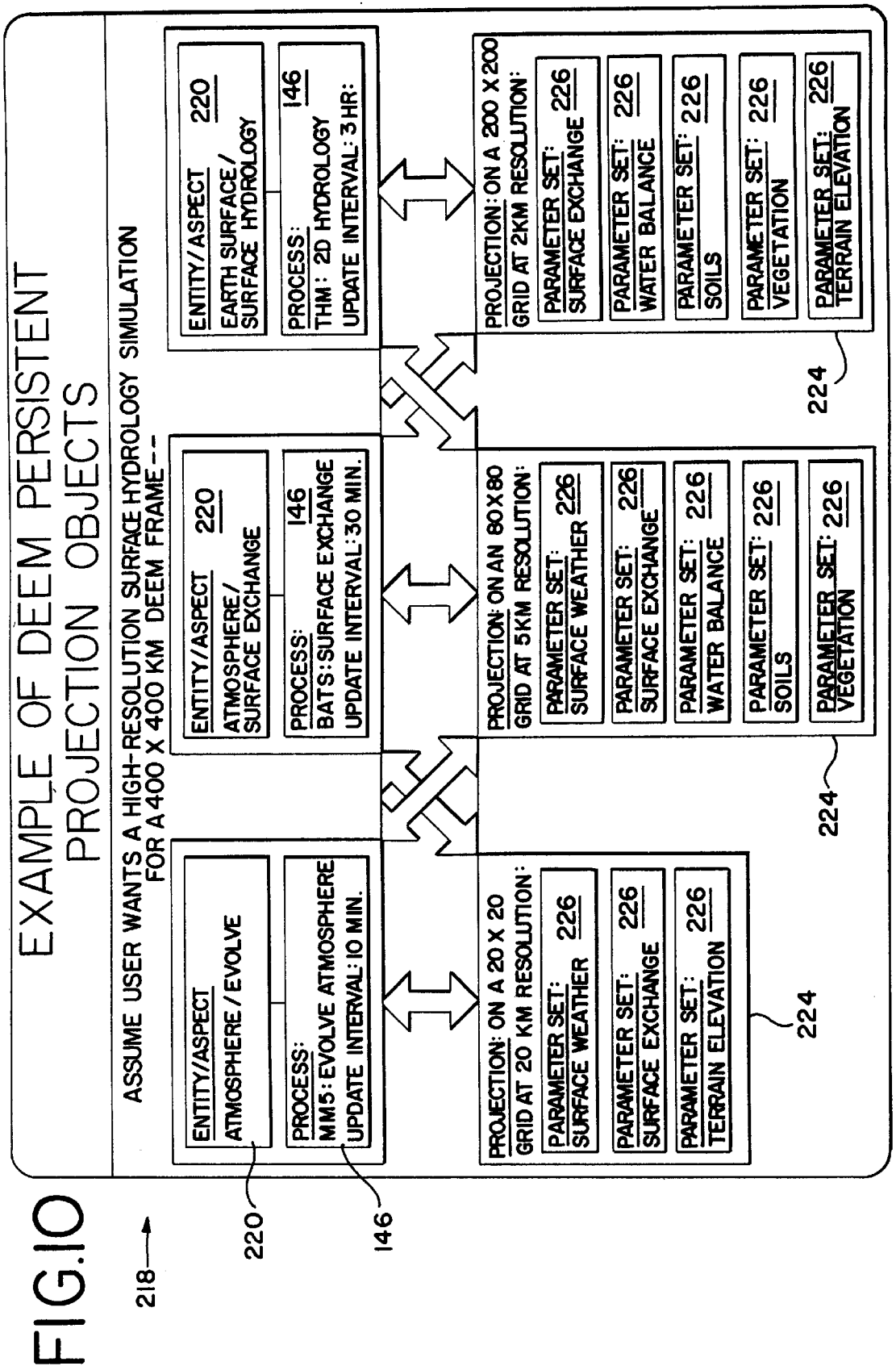
FIG. 10 illustrates a presently preferred persistent projection object.

Referring now to FIG. 10, an example of the preferred structure for a persistent projection object 218 is shown. In the example, it is assumed that the user wants a high resolution surface hydrology simulation for a 400 kilometer by 400 kilometer frame. Three entity/aspect pairs 220 are provided, each of which is coupled to a respective process 146. The entity/aspect pairs 220 shown include the atmosphere/evolve pair 220, the atmosphere/surface exchange pair 220 and the earth surface/surface hydrology pair 220. The respective process 146 associated with each entity/aspect pair 220 illustrated in FIG. 10 includes is the MM5: evolve atmosphere process 146, the BATS: surface exchange process 146, and the THM: two dimensional hydrology process 146. The update interval for each of these processes 146 can preferably vary, and some presently preferred intervals are provided in the illustration.

Each process 146 shown in FIG. 10 is in turn coupled to one or more projections 224. Each projection 224 has associated with it one or more parameter sets 226. Examples of the alternate projections provided in FIG. 10 include projections for a 20×20 grid at 20 kilometer resolution, an 80×80 grid at 5 kilometer resolution, and a 200×200 grid at 2 kilometer resolution. Parameter sets 226 pertinent to each projection 224 are also illustrated in FIG. 10.

Figure 11:
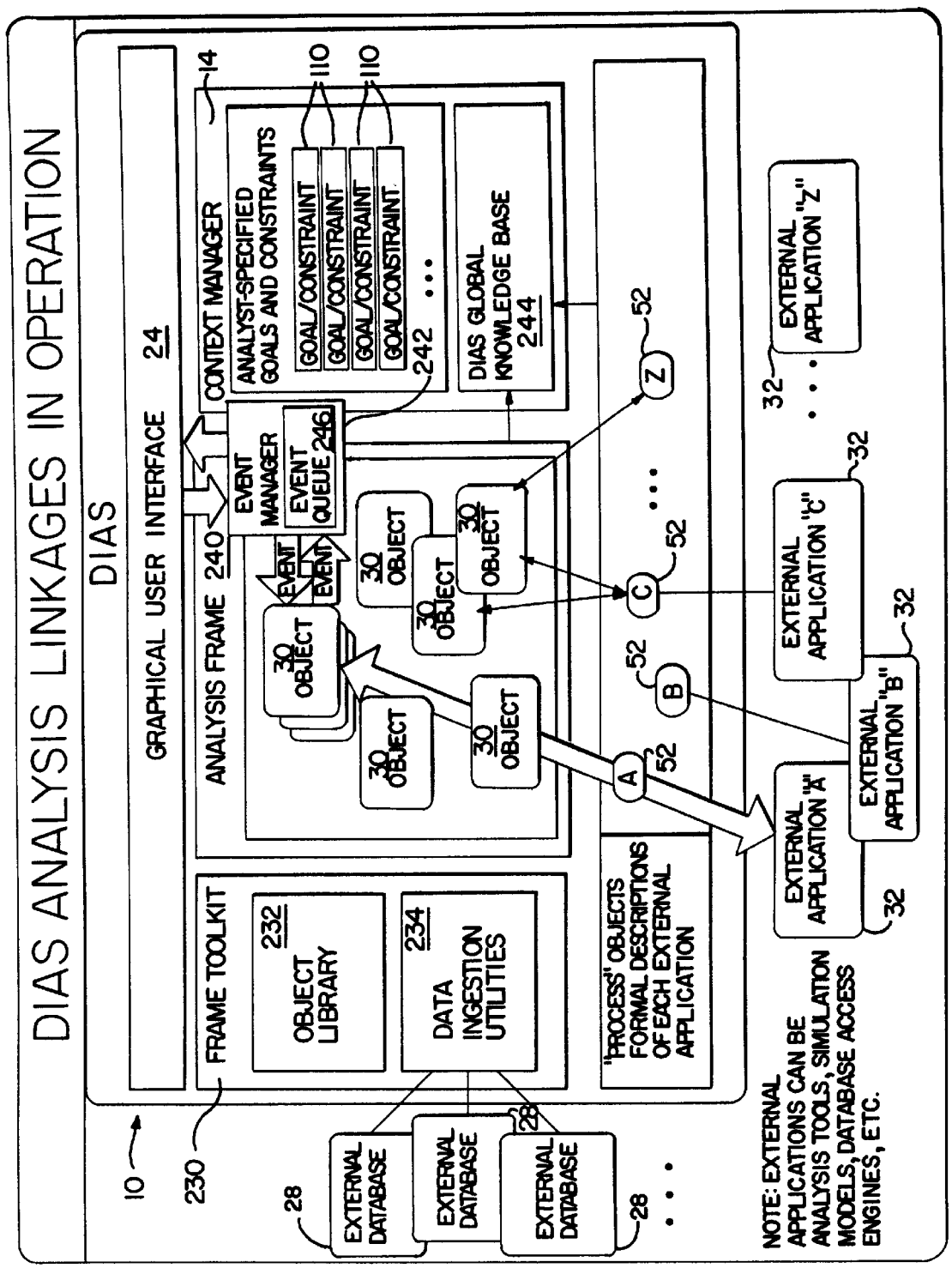
FIG. 11 shows an illustration of analysis linkages being made at run-time.

A comprehensive illustration of the analysis linkages created during the operation of the presently preferred embodiment of the invention is shown in FIG. 11. As those skilled in the art will appreciate, the information illustrated in FIG. 11 corresponds to the dynamic information system 10 shown in FIG. 1. The linkages shown in FIG. 11, therefore, represent the processing that occurs between the various blocks shown in FIG. 1 upon receipt by the system 10 of a user's goals and constraints 110. Accordingly, within the dynamic information system 10 the functions illustrated in FIG. 11 take place to dynamically link at run-time one or more computer models 32 to a computer expert system. As mentioned above, the user or operator communicates with the system via a graphical user interface 24 to supply the user's goals and constraints 110 requested of the computer expert system. The user's goals and constraints 110 are collected and maintained by the context manager 14. The context manager 14 includes a global knowledge base 244 stored in a memory (not shown), which receives data from the analysis frame 240.

Upon receipt of input from the user via the graphical user interface 24, an event manager 242 assembles an event queue 246 to communicate events 160 (see FIG. 7) to and from objects 30 within the analysis frame 240. As those skilled in the art will appreciate, the system 10 is preferably an event driven system. In the preferred embodiment, the system 10 is implemented to execute as a computer program on a personal computer. Moreover, the events 160 are defined as required by the context manager 14. Events are automatically compiled into the event queue and scheduled for execution in sequence to run a user's computer simulation.

As illustrated in FIG. 11, one or more objects 30 may be required by the particular user's goals and constraints 110. The objects 30 establish a link through one or more processes 52 to one or more external computer models 32. As mentioned above, each process 52 consists of a formal description for a respective external computer model 32. As shown in FIG. 11, each computer model 32 can be represented as an external application. For each external model 32, therefore, there is an associated process 52 that is linked to one or more objects 30 required by the analysis frame 240. Some presently preferred examples of the types of external applications provided by the preferred computer models 32 include analysis tools, simulation models, and database access engines. Of course, as those skilled in the art will appreciate, other external applications are contemplated without departing from the spirit and essential scope of the invention.

The linkages between the objects 30 and the external computer models 32 may also require the use of the frame tool kit 230. The frame tool kit 230 includes the object library 232 and data ingestion utilities 234. The object library 232 contains the one or more objects 30 registered or stored within the dynamic information system 10. These objects 30 are invoked or accessed depending upon the user's inputted goals and constraints 110. The data ingestion utilities 234 consist of units that enable access to one or more external databases 28. The data ingestion utilities 234 thus allow for the incorporation of data from the one or more external databases 28 for use with the dynamic information system 10. As mentioned above, the output created in response to the user's goals and constraints 110 is stored in a context object 104 (see FIG. 4). Accordingly, data from the analysis frame 240 and the process object 52 are used to compile the global knowledge base 244 from the results stored in the context objects 104.

The scope of an event 20 used with the dynamic information system 10 can be described in as association of an event type and an event origin. The event origin includes an entity class and an aspect. For example, for the event type "tree windfall" the entity class can be "forest" and the aspect can be "storm effects". In this example, the event scope can be the forest which originated the event, any road or rail arcs proximal to the event or any overhead power lines proximal to the event. An example of one presently preferred event scope with respect to a road net element 150 is shown in FIG. 12.

Figure 12:
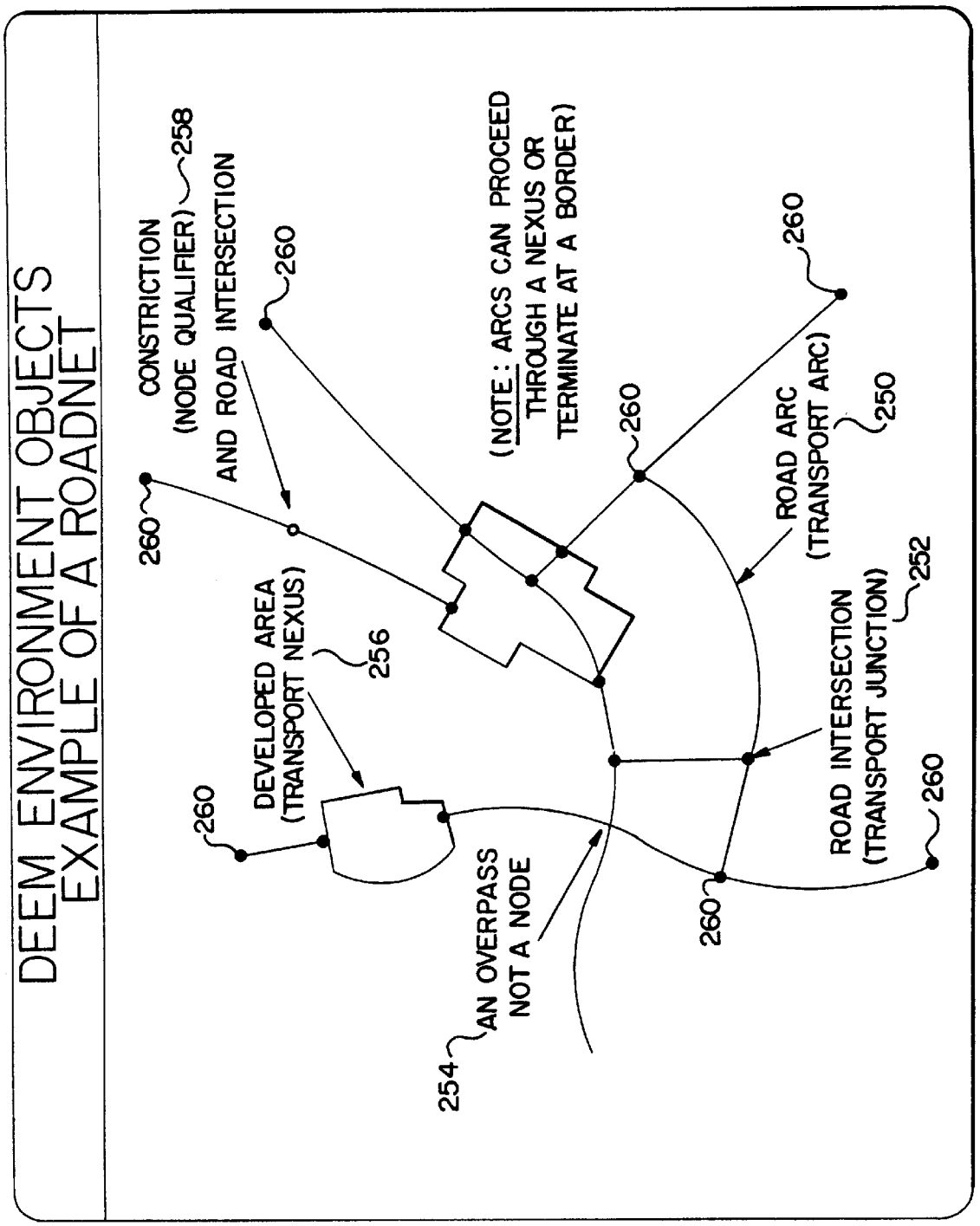
FIG. 12 is an illustration of a presently preferred example of a road net entity for use with the invention.

As illustrated in FIG. 12, the road net element can include a transport arc 250, transport junction 252, overpass 254, transport nexus 256 and node qualifier 258. The transport arc 250 represents a road arc, which can proceed through a transport nexus 256 or terminate at a border 260. The transport junction 252 represents a road intersection, and the transport nexus 256 represents a developed area such as a town or city. The overpass 254 is not a node and thus no connection is made at that point in the road net. The node qualifier 258, however, represents a constriction in the road or a road intersection.

In accordance with the above examples, the following taxonomy can be employed for object classification. The transportation network shown in FIG. 12 represents an object class with the features or behaviors of being capable of visualization, the moving of other objects, or it can be blocked by other objects. The object class "woody plant", for example, can have the features or behaviors of being visualized or growing. Other examples of preferred object classes include a bump, ephemeris, the atmosphere, or other structures. The features or behaviors of a bump can consist of terrain modification, visualization, containing water, or capable of destruction. The features or behaviors of the ephemeris object class can be the time dependent locations of the sun, moon, or stars. The object class "atmosphere" can produce clouds, precipitation and winds, where the precipitation flows over terrain, in winds, and moves smoke and dust. The structures object class has the features or behaviors of moving within a specified region or being capable of being damaged.

Although most of the examples described above in connection with the presently preferred embodiments of the invention relate to terrestrial and/or atmospheric environments, those skilled in the art will appreciate that other applications and environments are contemplated. For example, the dynamic information system 10 can be applied to surgical applications, as well as military theaters or environments. In other words, the dynamic information system 10 can model large complex systems of the types described above that include many aspects, events, and processes. Moreover, models of various scope can be combined to yield even bigger conglomerate models of very complex systems. In the preferred embodiment of the invention, the inputs and outputs of the independent models can be advantageously combined to provide inputs and outputs to one another thus creating a larger overall model.

The dynamic information system and method thus provides numerous advantages heretofore unobtainable from the prior art. Due to its use of objects to represent various processes modeled by external computer models, the system is easy to change, reconfigure or build upon. To change or reconfigure one part of the system only requires modification of the related objects. Adding to the system, conversely, only requires the addition of further objects.

The system also allows access to many different computer models at the same time. As those skilled in the art will appreciate, the complexity of coupling just two independently created computer models requires some significant efforts. Connecting many models represents a major departure over the application or extent of the prior art. Moreover, computer models can be integrated and accessed by the system where the various computer models are expressed at differing levels of detail or scale. Many large scale models can thus be quickly integrated to provide accurate responses to a user's input. The event queue assembled by the system further simplifies the creation and execution of event driven simulations.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents that are intended to define the spirit and scope of this invention.

We claim:

1. A system for receiving a user's inquiry containing a formally defined problem statement and linking at full-time at least one computer model to an expert system to address the inquiry, the system comprising:

a memory;

a plurality of computer models stored in the memory, each of the computer models for modeling an existing system or process and at least one of the computer models being independent of the other of the computer models, wherein each of the plurality of computer models is represented by a model object and at least one process object, the at least one process object standing as a proxy for a portion of code in the computer model that addresses an aspect of the behavior of an entity object, wherein the portion of code is formally defined in terms of input and output data dictionaries and an associated aspect object;

a common interface identifying the inputs, outputs and other specifications required to access each of the computer models;

an input device to receive the inquiry from the user to which at least one of the plurality of computer models can be applied; and a context manager comprising an inference engine in communication with the input, the context manager operable to access both the formally defined problem statement contained in the user's inquiry and a formal description of each of the plurality of computer models available to the system to automatically link at least one of the plurality of computer models to the expert system, to allow the expert system to respond to the user's inquiry.

2. The system defined in claim 1, wherein the context manager comprises a global knowledge base compiled from the formal description of each of the plurality of computer models.

3. The system defined in claim 1, wherein the plurality of computer models are not readily compatible with each other.

4. The system defined in claim 1, further comprising a plurality of object classes to implement a collection of objects that represent a problem domain, wherein the object classes comprise a frame object class, an entity object class and an aspect object class.

5. The system defined in claim 4, wherein the frame object class comprises at least one frame object corresponding to an area of interest and containing all entities relevant to the area of interest and the user's inquiry.

6. The system defined in claim 4, wherein the entity object class comprises at least one entity object forming an abstract super class for diverse types of objects participating in the user's inquiry.

7. The system defined in claim 4, wherein the aspect object class comprises at least one aspect object forming an expression of a single aspect of behavior of an entity object.

8. The system defined in claim 1, wherein the context manager assembles modeling links to meet user-specified goals and constraints.

9. The system defined in claim 1, wherein the inquiry received from the user is expressed in the form of a goal and constraint representing unsatisfied requirements.

10. The system defined in claim 1, wherein the model object stands as a proxy for a computer model.

11. The system defined in claim 10, wherein the model object comprises a formal definition of the computer model in terms of the at least one process object and the location of executable computer model code.

12. The system defined in claim 1, wherein the inference engine produces an output comprising a context object.

13. The system defined in claim 12, wherein the context object comprises information defining a model linkage that addresses the inquiry received from the user.

* * * * *

UNITED STATES PATENT AND TRADEMARK OFFICE
CERTIFICATE OF CORRECTION

PATENT NO. : 6,058,387
DATED : May 2, 2000
INVENTOR(S) : Allan P. Campbell et al.

It is certified that error appears in the above-identified patent and that said Letters Patent is hereby corrected as shown below:

In claim 1, line 2, please change "full-time" to --run-time--.

Signed and Sealed this

Twentieth Day of March, 2001

Attest:

NICHOLAS P. GODICI

*Attesting Officer*    *Acting Director of the United States Patent and Trademark Office*